United States Patent Office 3,489,629
Patented Jan. 13, 1970

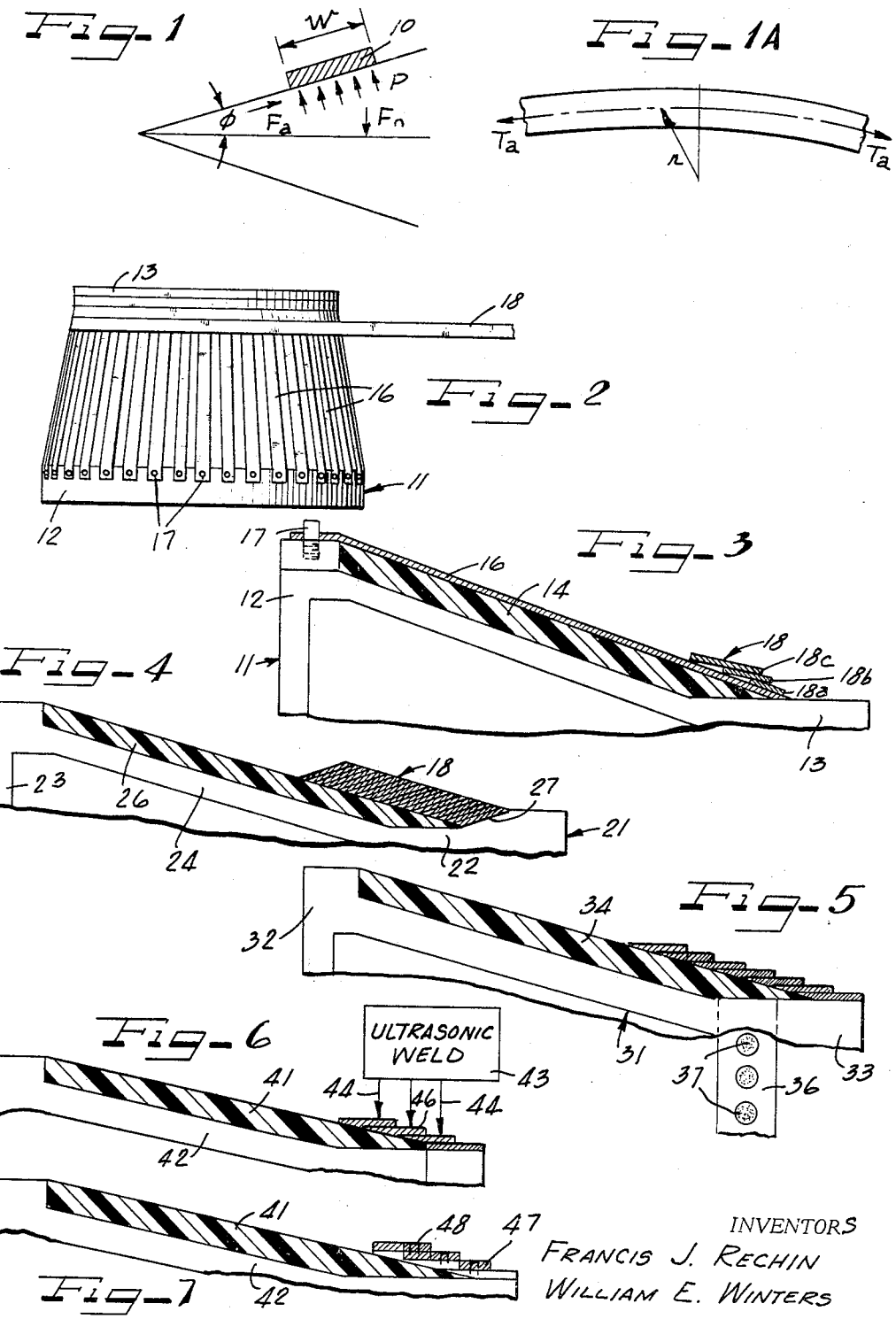

1

3,489,629
METHOD OF WRAPPING A PRETENSIONED TAPE ABOUT A PLASTIC LAYUP ON A CONICAL SURFACE
Francis James Rechin, Mentor, and William E. Winters, Euclid, Ohio, assignors to TRW Inc., Cleveland, Ohio, a corporation of Ohio
Filed May 10, 1966, Ser. No. 548,912
Int. Cl. B32b 31/04; B65h 81/06
U.S. Cl. 156—165
2 Claims

ABSTRACT OF THE DISCLOSURE

Method of wrapping a tape on a conical surface which involves tensioning the tape and applying it over a plastic layup over which there is stretched a plurality of abrasive coated strips.

---

The present invention relates to a method and apparatus for winding a pretensioned tape over a conical surface while minimizing the danger of axial slippage of the tape along the surface.

While the present invention is applicable to the winding of tapes about a conical body generally, it finds particular utility in the overwrapping of thermosetting resin bodies reinforced with mineral or synthetic fibers. Such composites were formerly consolidated by passing them into an autoclave or a hydroclave where they were kept for a sufficiently long period and under sufficiently high pressure to cause curing of the thermosetting resin into its infusible form. While this technique was feasible for relatively small composites, the capital investment involved in large autoclaves or hydroclaves rendered the cost of fabricating large dimension pieces by this technique prohibitive.

In a more recently used process, the resin impregnated mass was laid up on a mandrel, and a pretensioned tape was wound over the mass to provide the requisite pressure for the curing reaction. Typically, materials such as nylon or Dacron (polyester fiber made from polyethylene terephthalate) tapes were used, the former being preferred. A typical wrapping tape consists of a nylon tape 1" in width and having a thickness of about 0.050". Such a tape has a strength of about 1200 to 1300 pounds per inch, and a high elongation (about 30%) at room temperature. The nylon tape has excellent strength retention properties at high temperatures, and can be wound at very high tensions, approximating 80% of the ultimate tensile strength of the tape. All of these properties make the nylon tape an excellent medium for use in the overwrapping technique.

While this technique can be used successfully in simple geometries, there is a distinct slippage problem presented when the overwrapping is applied to a conical surface. The prevention of such axial slippage is the principal object of the present invention.

Another object of the invention is to provide a method for wrapping pretensioned tape over a conical surface which does not require expensive auxiliary equipment.

Another object of the invention is to provide a method of wrapping a pretensioned tape over a conical surface in a high speed operation.

Another object of the invention is to provide improved forms of apparatus for wrapping a tape in convolute form over a conical surface to prevent axial slippage.

Other objects and features of the present invention will be apparent to those skilled in the art from the following detailed description of the attached sheet of drawings in which:

FIGURES 1 and 1A are free body diagrams illustrating the forces involved in the overwrap operation;

2

FIGURE 2 is a view in elevation of a mandrel assembly which can be used in accordance with a preferred embodiment of the invention;

FIGURE 3 is a fragmentary cross-sectional view of the mandrel assembly shown in FIGURE 2;

FIGURE 4 is a fragmentary cross-sectional view of a mandrel and tape winding assembly forming another embodiment of the present invention;

FIGURE 5 is a fragmentary cross-sectional view of still a further embodiment of the invention;

FIGURE 6 is a partially schematic, partially cross-sectional view of still a further form of the invention; and FIGURE 7 is a fragmentary cross-sectional view of another form of the invention.

As shown in the drawings:

In FIGURES 1 and 1A, we have illustrated diagrammatically the forces involved in a process using a high tension, low modulus precisely controlled overwrap webbing or tape 10 having a width $w$ illustrated in FIGURE 1. The tape is shown being wound upon a conical surface having an angle $\phi$ with the centerline of the cone.

The tension in the tape produces a force, $F_n$ normal to the centerline which is equal to:

$$F_n = \frac{T_a}{r}$$

The force $F_n$ can be resolved into two components, a pressure P normal to the surface and an axial force $F_a$, tangential to the surface. The pressure P is equal to:

$$P = \frac{F_n \cos \phi}{w} = \frac{T_a \sin \phi}{wr}$$

The axial force, $F_a$, is equal to:

$$F_a = F_n \sin \phi = \frac{T_a \sin \phi}{r}$$

The tension required in the tape as applied is equal to:

$$T_a = \frac{w^P r}{nK \cos \phi}$$

where $n$ is the total number of layers of tape per inch and K is the relaxation factor.

From the foregoing, it will be seen that the axial slippage force present in a conical surface can be substantial when the tape is wound under high tension and at a substantial angle to the axis.

In FIGURE 2, there is illustrated one of the preferred means for preventing such axial slippage. In that figure, reference numeral 11 has been applied generally to a mandrel having a conical surface extending between a relatively large diameter end portion 12 and a smaller diameter end portion 13. The conical surface is first provided with a plastic layup 14 composed, for example, of refractory fibers embedded in a thermosetting resin such as a B stage phenolformaldehyde condensation product.

In accordance with the improvements of the present invention, the outer surface of the plastic layup 14 is covered with a plurality of spaced axial strips 16, each of the strips being secured at the large diameter end 12 of the mandrel by means of pins 17 or the like which anchor the end of the strip to the mandrel. Although not shown in the drawings, it will be understood that the mandrel 11 is mounted for rotation along its axis. A pretensioned tape 18 of nylon or the like is wound over the strips 16 starting at the smaller diameter end 13 and proceeding upwardly to the larger diameter end 12 of the mandrel.

The strips 16 are coated with an abrasive material such as sand particles or other refractory abrasive substances. The tape 18 is wound in convolute form, with about a 50% overlap between adjoining convolutions 18a, 18b and 18c. Each convolution contacts the abrasive coated strips 16 and is held in place by the abrasive coating. Thus, the entire axial load is transmitted to the mandrel 11 by tension in the strip 18.

In the form of the invention illustrated in FIGURE 4 of the drawings, the orientation of the convolutions themselves in the overwrap is used to minimize the tendency to slide down the mandrel. In this form of the invention, there is provided a mandrel 21 having a reduced diameter end portion 22 and a large diameter end portion 23 with a conical surface 24 extending therebetween. The plastic layup has been identified at reference numeral 26 in FIGURE 4. In this embodiment of the invention the smaller diameter end of the mandrel is machined to provide the ramp 27, the ramp providing a floor for the wrapping of the tape at an angle substantially the same as the angle of inclination of the conical surface 24. Thus, the tape 18 is wound starting on the ramp 27 and proceeds upwardly along the conical surface to the larger diameter end of the mandrel. In this embodiment, instead of a friction force holding successive layers in place, a compressive force is developed between layers because of their orientation.

In FIGURE 5, reference numeral 31 indicates generally a mandrel structure having a large diameter end portion 32 and a smaller diameter end portion 33. The plastic overlay is indicated at reference numeral 34 in that figure. In this form of the invention, the conical surface is wound with a pretensioned tape 36 having spaced deposits of an adhesive 37 therealong, the tape 36 being wound in convolute form upwardly from the smaller diameter end of the mandrel to the larger diameter end as illustrated in FIGURE 5. The adhesive is of the quick setting type, and is applied to the tape at spacings sufficiently close, and in sufficient amounts, to develop enough shear strength to carry the axial load. The adhesive bond is able to carry much higher axial loads than the friction normally existing between layers of tape.

In the embodiment illustrated in FIGURE 6, a plastic overlay 41 is shown applied to a conical surface 42 of the mandrel, and an ultrasonic welding unit is generally indicated at reference numeral 43. Electrodes 44 extend in proximity to the convolutions of the tape 46, and weld the overlapping convolutions to each other. This welding provides sufficient strength to carry the required axial load.

In the form of the invention shown in FIGURE 7, the adjoining convolutions of the tape 47 are held together mechanically as by means of staples 48 which are driven every few inches along the overlapping areas of the convolutions to provide sufficient axial strength to carry the axial load.

From the foregoing, it will be understood that the method and apparatus of the present invention provide a convenient means for preventing axial slippage of a pretensioned tape along a conical surface being wound. The winding operation can be carried out at high speeds, and with only a small amount of additional equipment being used. The small amount of equipment makes it possible to provide for on-site fabrication of large structures. Furthermore, there is no size limitation inherent in the method and apparatus of the present invention.

We claim as our invention:

1. A method of wrapping a tape on a conical surface which comprises applying a plastic layup to a conically shaped mandrel, attaching a plurality of axially extending strips to the mandrel, the strips having an abrasive coating thereon selected from the group consisting of said and other refractory materials, the strips extending along the resulting conically shaped layup, and wrapping a tensioned tape about said strips in convolute form.

2. The method of claim 1 in which the tape is wound with about a 50% overlap between adjoining convolutions of said tape.

References Cited
UNITED STATES PATENTS

| | | | |
|---|---|---|---|
| 3,115,271 | 12/1963 | Anderson et al. | 156—189 XR |
| 2,133,108 | 10/1938 | Muller. | |
| 3,300,356 | 1/1967 | Warnken et al. | 156—189 |
| 3,312,250 | 4/1967 | Sirignano et al. | 156—73 XR |

PHILIP DIER, Primary Examiner

U.S. Cl. X.R.

156—189, 192, 443

PO-1050
(5/69)

UNITED STATES PATENT OFFICE
CERTIFICATE OF CORRECTION

Patent No. 3,489,629          Dated January 13, 1970

Inventor(s) Francis J. Rechtin and William E. Winters

It is certified that error appears in the above-identified patent and that said Letters Patent are hereby corrected as shown below:

Column 4, line 24, change "said" to read --sand--.

SIGNED AND
SEALED
JUN 23 1970

(SEAL)
Attest:

Edward M. Fletcher, Jr.
Attesting Officer

WILLIAM E. SCHUYLER, JR.
Commissioner of Patents